(12) United States Patent
Asrani et al.

(10) Patent No.: US 9,065,518 B2
(45) Date of Patent: Jun. 23, 2015

(54) EVOLVING ANTENNA SYSTEM BASED ON USER HABITS

(71) Applicant: MOTOROLA MOBILITY LLC, Libertyville, IL (US)

(72) Inventors: Vijay L. Asrani, Round Lake, IL (US); Adrian Napoles, Lake Villa, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 104 days.

(21) Appl. No.: 13/798,211

(22) Filed: Mar. 13, 2013

(65) Prior Publication Data

US 2014/0273882 A1  Sep. 18, 2014

(51) Int. Cl.
  *H04W 52/28* (2009.01)
  *H04B 7/08* (2006.01)
  *H04B 7/06* (2006.01)

(52) U.S. Cl.
  CPC ............ *H04B 7/0871* (2013.01); *H04B 7/0689* (2013.01); *H04W 52/288* (2013.01)

(58) Field of Classification Search
  CPC ............................ H04B 1/3833; H04W 52/288
  USPC ........................................................ 455/73
  See application file for complete search history.

(56) References Cited

U.S. PATENT DOCUMENTS

| 6,657,595 | B1 | 12/2003 | Phillips et al. |
| 7,571,226 | B1 | 8/2009 | Partovi et al. |
| 2002/0094789 | A1 | 7/2002 | Harano |
| 2005/0075123 | A1* | 4/2005 | Jin et al. ......................... 455/522 |
| 2008/0085736 | A1 | 4/2008 | Kitamura et al. |
| 2008/0143609 | A1* | 6/2008 | Mashima et al. ............. 343/702 |
| 2011/0294488 | A1* | 12/2011 | Jin et al. ......................... 455/418 |
| 2012/0112970 | A1 | 5/2012 | Caballero et al. |

FOREIGN PATENT DOCUMENTS

| EP | 1524774 A1 | 4/2005 |
| EP | 2410661 A1 | 1/2012 |

OTHER PUBLICATIONS

European Patent Office, International Search Report and the Written Opinion of the International Searching Authority in International Patent Application No. PCT/US2014/021143 (Jul. 1, 2014).

* cited by examiner

*Primary Examiner* — David Bilodeau
(74) *Attorney, Agent, or Firm* — Leydig, Voit & Mayer, Ltd.

(57) ABSTRACT

A method and system configures an antenna system to enhance communication signal quality within a wireless communication device. An antenna system controller determines a usage state of the wireless communication device based on received sensor data. In addition, the antenna system controller determines whether the usage state matches a pre-identified reference usage state. If the usage state matches a reference usage state, the antenna system controller configures the antenna system using configuration data mapped to the reference usage state. In addition, the antenna system controller tracks occurrences of usage states to generate usage state statistics and uses the generated usage state statistics to predict a timing of future usage states within the wireless communication device. The antenna system controller configures the wireless communication device for the predicted usage state when an associated trigger event is detected. Additionally, the antenna system controller configures the antenna system based on signal quality feedback.

20 Claims, 8 Drawing Sheets

| # | Date | Time | Location | Application | Orientation | Hand Usage | Freq. band | Config. state |
|---|---|---|---|---|---|---|---|---|
| 1 | 5/1/12 | 10:00 | Home | You Tube | Landscape | Left & Right | LTE Band 13 | A |
| 2 | 5/1/12 | 10:30 | Home | Phone Call | Talk | Left | CDMA BC0 | B |
| 3 | 5/2/12 | 10:30 | Work | Phone Call | Talk | Left | CDMA BC0 | B |
| 4 | 5/2/12 | 11:30 | Work | Browser | Portrait | Left | LTE Band 13 | C |
| 5 | 5/3/12 | 10:30 | Home | Phone Call | Talk | Left | CDMA BC0 | B |
| 6 | 5/3/12 | 11:00 | Work | Email | Portrait | Left | LTE Band 13 | C |
| 7 | 5/4/12 | 10:30 | Home | Phone Call | Talk | Left | CDMA BC0 | B |
| 8 | 5/4/12 | 11:30 | Work | Email | Portrait | Left | LTE Band 13 | C |
| 9 | 5/4/12 | 12:00 | Work | You Tube | Landscape | Left & Right | LTE Band 13 | A |

EVOLVING ANTENNA SYSTEM BASED ON USER HABITS

BACKGROUND

1. Technical Field

The present disclosure relates in general to wireless communication devices and in particular to antenna system configuration in wireless communication devices.

2. Description of the Related Art

As electronic and communication components decrease in size, designers of wireless communication products have increasingly developed smaller wireless communication devices. With a reduction in the size of wireless communication devices, a user or operator encloses a greater portion of the wireless communication device and antennas within his/her hand during active device operation. As a result, antenna radiation performance is degraded. Furthermore, a consumer is likely to notice a degradation of call quality depending on whether the operator uses a left hand or right hand while operating the wireless communication device. In addition, wireless industry trade groups and wireless communication service providers have increasingly focused on providing specifications associated with a manner in which an actively operating wireless communication device is held within a user's hands.

BRIEF DESCRIPTION OF THE DRAWINGS

The described embodiments are to be read in conjunction with the accompanying drawings, wherein.

DETAILED DESCRIPTION

The illustrative embodiments provide a method and system for configuring an antenna system to enhance communication signal quality within a wireless communication device. An antenna system controller determines a usage state of the wireless communication device based on received sensor data. In addition, the antenna system controller determines whether the usage state matches a pre-identified reference usage state. If the usage state matches a reference usage state, the antenna system controller configures the antenna system using configuration data mapped to the reference usage state. If the usage state does not match a reference usage state, the antenna system controller configures the antenna system using configuration data mapped to a default usage state. In addition, the antenna system controller tracks occurrences of usage states to generate usage state statistics and uses the generated usage state statistics to predict a timing of future usage states within the wireless communication device. The antenna system controller configures the wireless communication device for the predicted usage state when an associated trigger event is detected. In one embodiment, the antenna system controller configures the antenna system based on signal and/or call quality feedback.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 1:
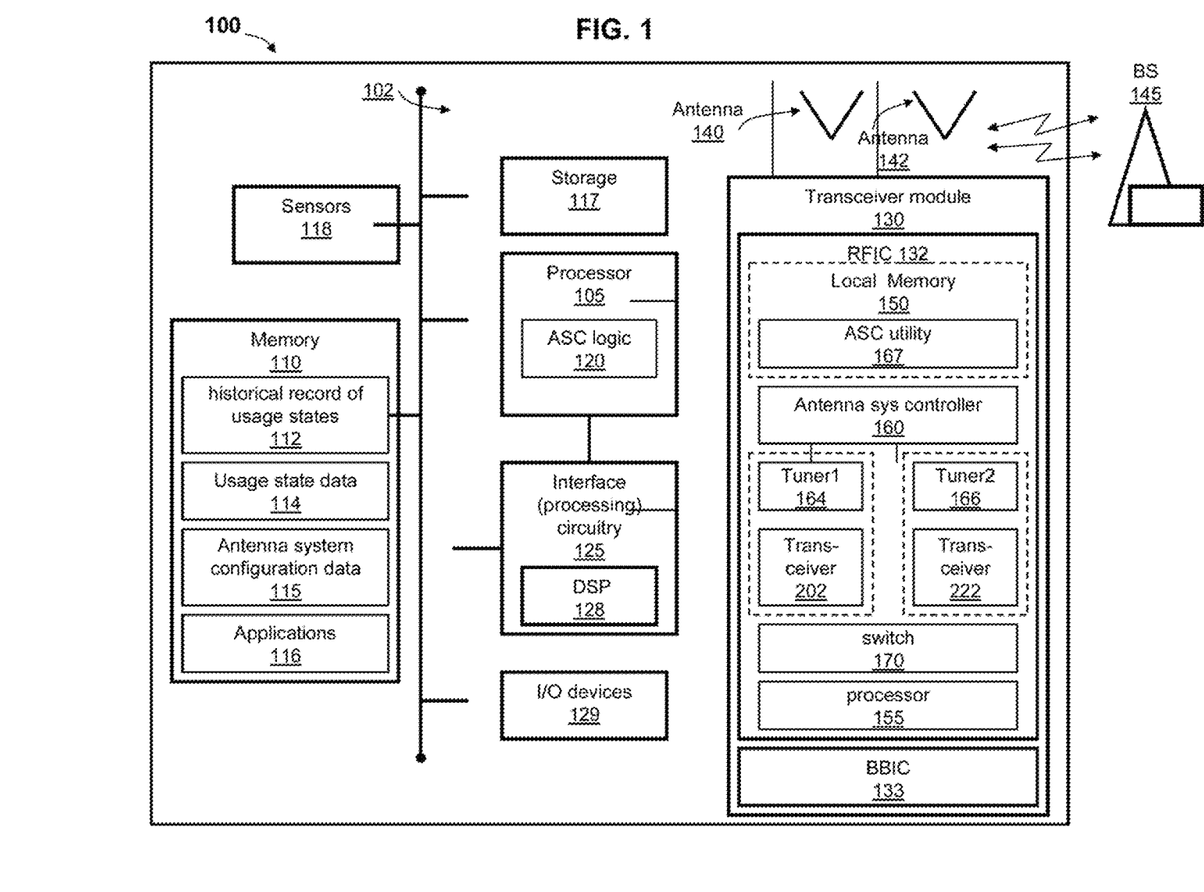
FIG. 1 is a block diagram illustrating an example wireless communication device within which the various features of the described embodiments can be advantageously implemented, according to one embodiment.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards, such as Global System for Mobile Communications (GSM) Code Division Multiple Access (CDMA), Orthogonal Frequency Division Multiple Access (OFDMA), and similar systems. In addition, wireless communication device 100 is able to utilize a number of communication means (e.g., carrier aggregation and simultaneous voice and LTE (SVLTE)) that concurrently enables simultaneous signal propagation. In one or more embodiments, the wireless communication device can be a mobile cellular device/phone or smartphone, or laptop, netbook or tablet computing device, or other types of communications devices. Wireless communication device 100 comprises processor 105 and interface circuitry 125, which are connected to memory component 110 via signal bus 102. Interface circuitry 125 includes digital signal processor (DSP) 128. In addition, wireless communication device 100 comprises storage 117. Also illustrated within wireless communication device 100 are input/output (I/O) devices 129. Wireless communication device 100 also includes a transceiver module 130 for sending and receiving communication signals. In at least some embodiments, the sending and receiving of communication signals occur wirelessly and are facilitated by one or more antennas 140 and 142 coupled to the transceiver module 130. The number of antennas can vary from device to device, ranging from one or more antennas, and the presentation within wireless communication device 100 of two antennas 140, 142 is merely for illustration. Wireless communication device 100 also includes a number of sensors 118 which provide sensor data to antenna system controller 160. In one embodiment, sensors 118 are positioned at various locations within wireless communication device 100 including, but not limited to, locations proximate to or on an external housing (not shown) of wireless communication device 100 to collect specific types of sensor data.

Wireless communication device 100 is able to wirelessly communicate to base-station 145 via antenna 140 and antenna 142. Base station 145 can be any one of a number of different types of network stations and/or antennas associated with the infrastructure of the wireless network and configured to support uplink and downlink communication via one or more of the wireless communication protocols, as known by those skilled in the art.

Transceiver module 130 comprises baseband integrated circuit (BBIC) 133 and radio frequency integrated circuit (RFIC) 132. RFIC 132 comprises a memory or storage system 150. In one embodiment, RFIC 132 also includes local processor 155, which may be described as a digital signal processor (DSP). Transceiver module 130 also comprises antenna system controller 160. In addition, transceiver module 130 comprises first antenna tuner 164, second antenna tuner 166, first transceiver 202 and second transceiver 222. Also included in transceiver module 130 are switch 170 and other radio communication components shown in FIG. 2. In one implementation, antenna system controller 160 is communicatively coupled to both antenna tuners 164 and 166. According to one aspect of the disclosure, local memory/storage 150 includes therein firmware, such as Antenna System Configuration (ASC) utility 167, which supports the various processing functions of transceiver module 130. The structural makeup of transceiver module 130 is described in greater detail in FIG. 2.

In addition to the above described hardware components of wireless communication device 100, various features of the invention may be completed or supported via software or firmware code and/or logic stored within at least one of memory 110 and local memory 150, and respectively executed by DSP 128, processor 105, or local processor 155 of transceiver module 130. Thus, for example, illustrated within system memory 110 and/or local memory 150 are a number of software, firmware, logic components, or modules, including applications 116, historical record of usage states 112, usage state data 114, antenna system configuration data 115, and ASC utility 167.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
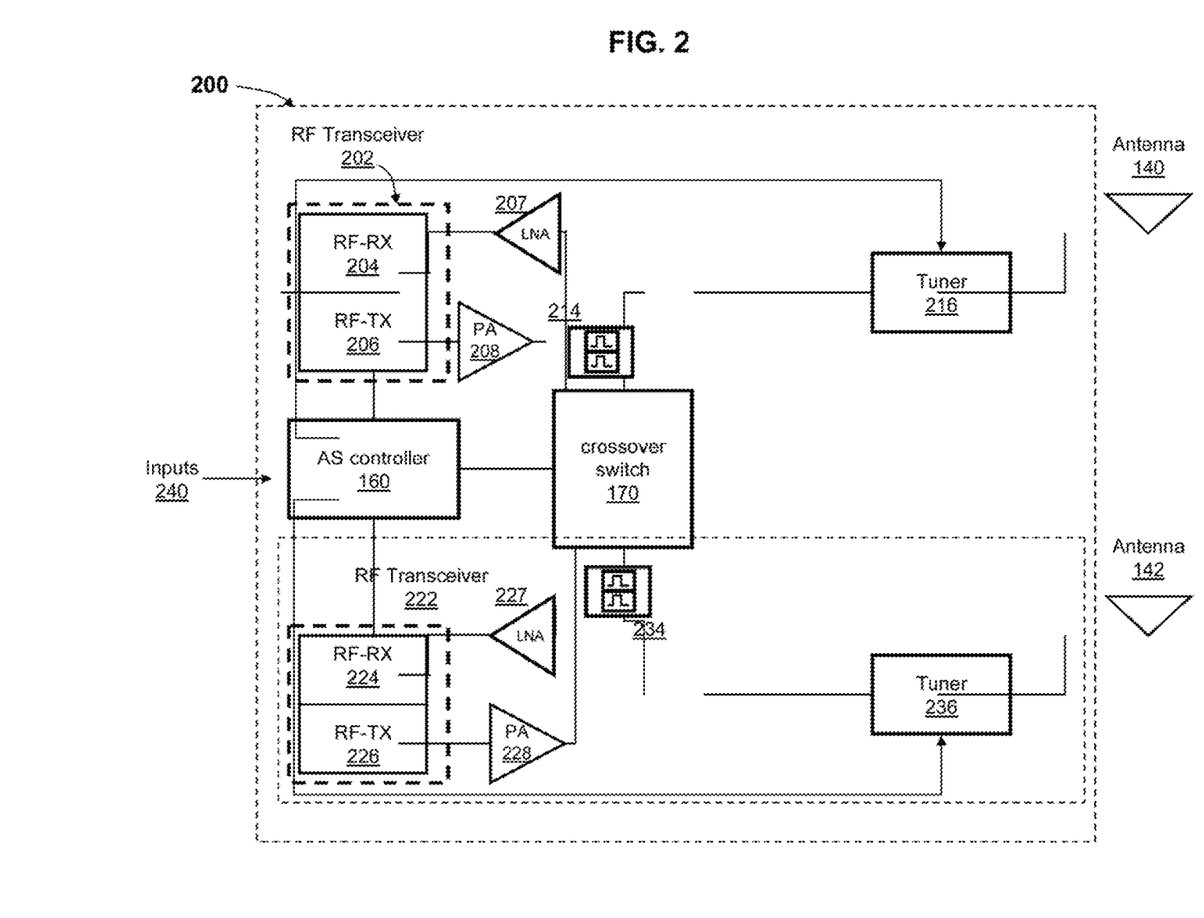
FIG. 2 provides a block diagram representation of a structural configuration of a transceiver module having an antenna system controller that configures an antenna system, according to one embodiment.

FIG. 2 provides a block diagram representation of a structural configuration of transceiver module 130, according to one embodiment. First transceiver module 200 comprises first RF transceiver 202, which includes first RF receiver (RX) 204 and first RF transmitter (TX) 206. First transceiver module 200 also comprises low-noise amplifier (LNA) 207 which is coupled to an input port of RF-RX 204. First transceiver module 200 also comprises first power amplifier (PA) 208 and duplexer 214. Duplexer 214 comprises a receiver filter and a transmit filter. First power amplifier 208 is coupled to an output port of RF-TX 206 and to an input port of duplexer 214. An output port of duplexer 214 is coupled to an input port of LNA 207. In addition, first transceiver module 200 comprises second transceiver 222, which includes a low-noise amplifier (LNA) 227 which is coupled to an input port of RF-RX 224. First transceiver module 200 also comprises second power amplifier (PA) 228 and duplexer 234. Duplexer 234 comprises a receiver filter and a transmit filter. Second power amplifier 228 is coupled to an output port of RF-TX 226 and to an input port of duplexer 234. An output port of duplexer 234 is coupled to an input port of LNA 227. In one embodiment, the duplexers 214 and 234 are tunable to operate in the frequency band of operation. In addition, first transceiver module 200 comprises antenna system controller 160 which is coupled to both RF transceivers 202 and 222. In one embodiment, antenna system controller 160 receives sensor data which are illustrated as inputs 240. First transceiver module 200 also comprises crossover switch 170 which is coupled to antenna system controller 160. In addition, crossover switch 170 is respectively coupled to input/output (I/O) ports of duplexers 214 and 234. Also included within first transceiver module 200 are first antenna tuner 216 and second antenna tuner 236 which are respectively coupled to crossover switch 170. As illustrated, first antenna tuner 216 is coupled to first antenna 140, and second antenna tuner 236 is coupled to second antenna 142. An antenna system, which is discussed herein, comprises transceivers 202 and 222, crossover switch 170, antenna tuners 216 and 236, and antennas 140 and 142. An embodiment of an antenna system (i.e., antenna system 420) is explicitly shown in FIG. 4.

In first transceiver module 200, antenna system controller 160 identifies a usage state of wireless communication device 100. In addition, antenna system controller 160 determines whether the identified usage state matches a pre-identified reference usage state from among at least one pre-identified reference usage state of wireless communication device 100. A usage state matches a reference usage state when the usage state is correlated with a reference usage state. In response to the identified usage state matching a pre-identified usage state, antenna system controller 160 configures the antenna system with configuration data mapped to the reference usage state to enhance an antenna performance of wireless communication device 100.

Antenna system controller 160 determines the usage state from data provided by various sensors 118. For example, antenna system controller 160 receives sensor data from at least one sensor from among: (a) a location sensor; (b) atmospheric pressure sensor; (c) an accelerometer; (d) a gyroscope; (e) a WiFi signal level sensor; (f) a Bluetooth signal level sensor; (g) a proximity detect sensor; and (h) a light sensor. In one embodiment, wireless communication device 100 includes hand placement sensors, such as pressure and/or capacitive touch sensor(s). In response to receipt of sensor data, antenna system controller 160 determines, using the received sensor data, various parameters of the usage state including a parameter for device handling and positioning. Furthermore, antenna system controller 160 determines the usage state based on an application type initiated by the user and an operating frequency band that is active when the usage state occurs. In association with one aspect or parameter of device handling and positioning, antenna system controller 160 identifies from sensor data (e.g., data from an accelerometer, a touch and/or a proximity sensor) whether the user interacts with the wireless communication device using at least one of (a) a left hand, (b) a right hand, (c) both hands, (d) neither the left hand nor the right hand, (e) a left side of a user's head and (f) a right side of the user's head. Antenna system controller 160 is able to appropriately configure wireless communication device 100 based on antenna positions of wireless communication device 100 and a manner in which the user holds and/or interacts with wireless communication device 100.

Referring again to the reference usage state, in response to the identified usage state not matching a reference usage state, antenna system controller 160 stores information about the usage state within a collection of reference usage states stored in memory 110 or in a database (not shown). In addition, antenna system controller 160 determines configuration parameters that best configure the antenna system for supporting operations of the device while in the usage state. Antenna system controller 160 updates a historical record of usage states 112 with the information about the identified usage state to track occurrences of respective usage states. Antenna system controller 160 generates usage state statistics using the updated historical record and predicts a timing of and/or the occurrences of specific future usage states based on the usage state statistics. Additionally, antenna system controller 160 identifies one or more trigger events associated with the occurrence of the future usage state. Antenna system controller 160 uses these trigger events as a precursor(s) to the future usage state. A trigger event can include time and/or date of usage state occurrence, detected location of a corresponding wireless communication device and/or activation of one or more associated applications. In one embodiment, in response to predicting the future usage state and detecting a trigger event(s) associated with the future usage state, antenna system controller 160 automatically configures the antenna system to support device operation in the future usage state using configuration parameters mapped to a corresponding reference usage state within the database.

In one embodiment, antenna system controller 160 generates, from the historical record, a probability distribution of usage states to derive the usage state statistics and identify user usage characteristics. In addition, antenna system controller 160 develops a user profile that indicates the user usage characteristics.

Antenna system controller 160 configures the antenna system by (a) selectively switching propagation of a communication signal from a first antenna (e.g., antenna 140) to a second antenna (e.g., antenna 142) using crossover switch 170, (b) adjusting transmit signal power, and/or (c) performing, via antenna tuner 216, antenna tuning corresponding to the usage state. In one embodiment, crossover switch 170 communicatively couples a single transmitter (e.g., RF-TX 206) to multiple antennas (e.g., antennas 140 and 142) to propagate a communication signal using a diversity transmission configuration. In general, crossover switch 170 can connect multiple signal input ports to multiple signal output ports using complex array matrices that are used to switch any one input path to any one or more output paths. As a result, crossover switch 170 can communicatively connect (a) a single transceiver port to a single antenna or multiple antennas or (b) multiple transceiver ports to multiple antennas, based on a pre-defined operating mode and/or antenna system configuration. More generally, antenna system controller 160, using crossover switch 170, configures the antenna system by selectively switching propagation of at least communication signal from a first antenna configuration comprising at least one antenna to a second antenna comprising at least one antenna.

To provide quick and efficient access to usage state data, antenna system controller 160 stores information about the usage state and the usage state statistics within at least one of (a) a local storage and (b) a remote storage. In one implementation, a database within wireless communication device 100 provides the local storage for usage state data. In one embodiment, a network cloud provides the remote storage for usage state data. By providing remote storage, a user is able to access a user profile, corresponding usage statistics and user usage characteristics to be able to properly configure any wireless communication device the user operates as a subscriber device.

In response to a first usage state being associated with simultaneous propagation of both a higher priority signal and a lower priority signal, antenna system controller 160 determines or retrieves the configuration parameters that support the higher priority signal and utilizes these parameters when configuring the antenna system while the device is in the first usage state.

In response to the usage state not matching a reference usage state, antenna system controller 160 configures the antenna system with at least one of: (a) a default antenna system configuration; and (b) an antenna system configuration based on signal quality feedback. In one embodiment, antenna system controller 160 performs antenna system configuration to enhance antenna performance for the usage state using configuration parameters that are mapped to a matching reference usage state. The configuration parameters provide a specific signal quality performance for an initiated application.

Figure 3:
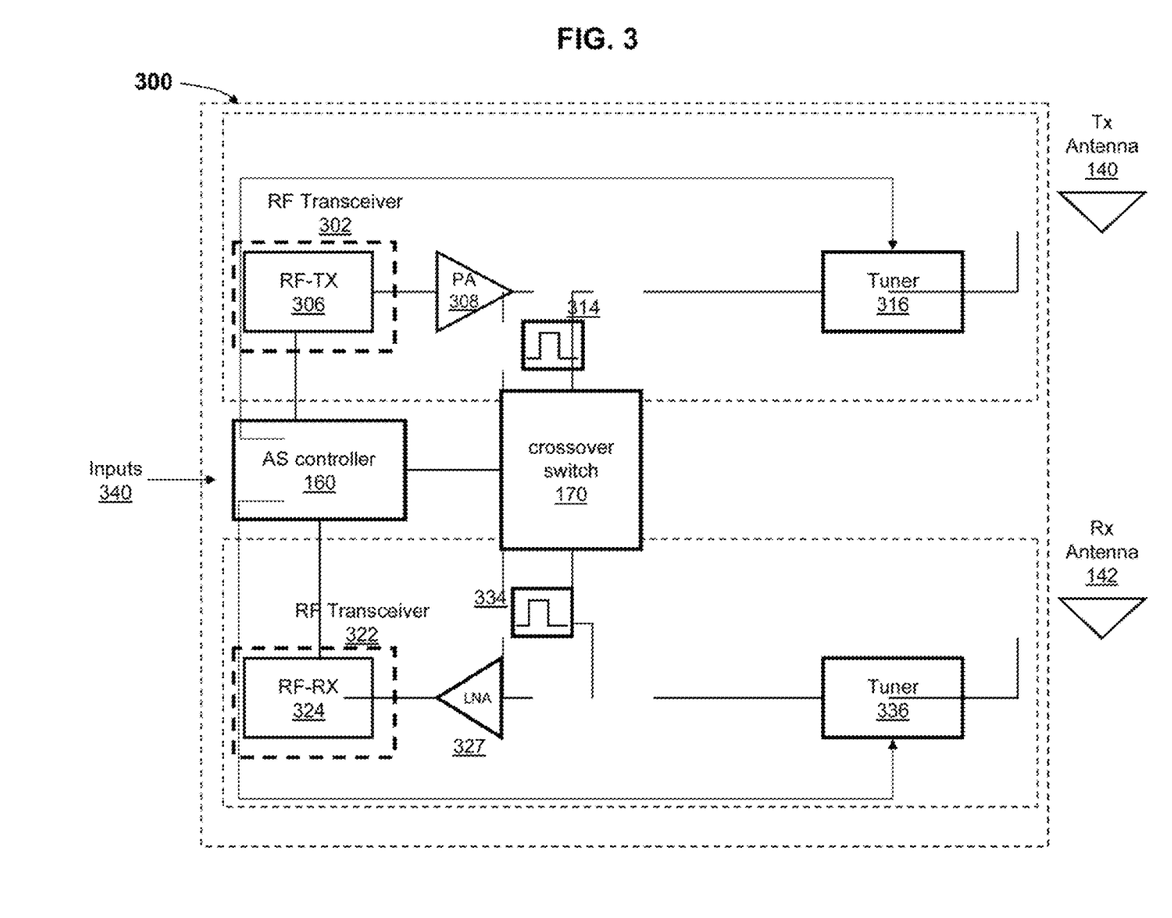
FIG. 3 is a block diagram illustrating another embodiment of a transceiver module having an antenna system controller that configures an antenna system, according to one embodiment.

FIG. 3 provides another block diagram representation of a structural configuration of transceiver module 130, according to one embodiment. Second transceiver module 300 is similar to first transceiver module 200 (FIG. 2). However, first RF transceiver 202 of first transceiver module 200 is illustrated with components first RF receiver (RX) 204 and first RF transmitter (TX) 206, while first RF transceiver 302 of second transceiver module 300 is illustrated with first RF transmitter (TX) 306 only. Furthermore, second RF transceiver 222 of first transceiver module 200 is illustrated with components second RF receiver (RX) 224 and second RF transmitter (TX) 226, while second RF transceiver 322 of second transceiver module 300 is illustrated with second RF receiver (RX) 324 only.

Second transceiver module 300 further comprises power amplifier (PA) 308, which is coupled to an output port of RF-TX 306. However, unlike first transceiver module 200, second transceiver module 300 does not include an LNA associated with first transceiver 302. Second transceiver module 300 also includes duplexer 314 which further includes a transmit filter. Duplexer 314 is coupled by an output port of duplexer 314 to an output port of PA 308. In addition, second transceiver module 300 comprises LNA 327 (associated with second transceiver 322) and duplexer 334 which further includes a receive filter. LNA 327 is coupled to an input port of RF-RX 324 and to an output port of duplexer 334. In one embodiment, duplexers 314 and 334 are tunable to operate in the frequency band of operation.

In addition, second transceiver module 300 comprises antenna system controller 160 which is coupled to both RF transceivers 302 and 322. In one embodiment, antenna system controller 160 receives sensor data which are illustrated as inputs 340. Second transceiver module 300 also comprises crossover switch 170 which is coupled to antenna system controller 160. In addition, crossover switch 170 is respectively coupled to input/output (I/O) ports of duplexers 314 and 334. Also included within second transceiver module 300 are first antenna tuner 316 and second antenna tuner 336 which are respectively coupled to crossover switch 170. As illustrated, first antenna tuner 316 is coupled to first antenna 140, and second antenna tuner 336 is coupled to second antenna 142.

Further description of FIG. 3 is used to illustrate an example antenna system that is configurable based on received sensor data. Wireless communication device 100 of FIG. 3 comprises a pair of antennas, one (transmit) antenna (e.g., antenna 140) for signal transmission and a next (receive) antenna (e.g., antenna 142) for signal reception. Referring specifically to the example antenna system, in a first antenna system configuration state, the transmit antenna is located at the bottom right side of an external housing (not shown) of wireless communication device 100 and the receive antenna is located at the bottom left of (the external housing of) wireless communication device 100. When the received sensor data indicates that the user is holding wireless communication device 100 in the left hand and the application used is downlink centric (e.g., streaming video), antenna system controller 160 determines that matching reference usage state data is mapped to a preferred antenna system configuration state in which the receive antenna is located at the bottom right corner of wireless communication device 100 and the transmit antenna is on the bottom left corner of wireless communication device 100. As a result, antenna system controller 160 configures wireless communication device 100 to a second antenna system configuration state in which crossover switch 170 switches signal transmission to an antenna located at the bottom left of wireless communication device 100 and signal reception to an antenna located at the bottom right of wireless communication device 100.

If the application is uplink centric (e.g., uploading a large file), the preferred antenna system configuration would have maintained the same antenna locations of the first antenna system configuration state which specifies that the transmit antenna is located at the bottom right side of wireless communication device 100 and the receive antenna is located at the bottom left of wireless communication device 100.

In one embodiment, antenna system controller 160 generates usage state statistics associated with the user's usage characteristics. If the generated usage stage statistics indicate a clearly established trend, in one embodiment, antenna system controller 160 can predict a timing of a future usage state involving a particular application (e.g., streaming video) and configure wireless communication device 100 for the future usage state without having to wait to detect that video streaming begins.

Figure 4:
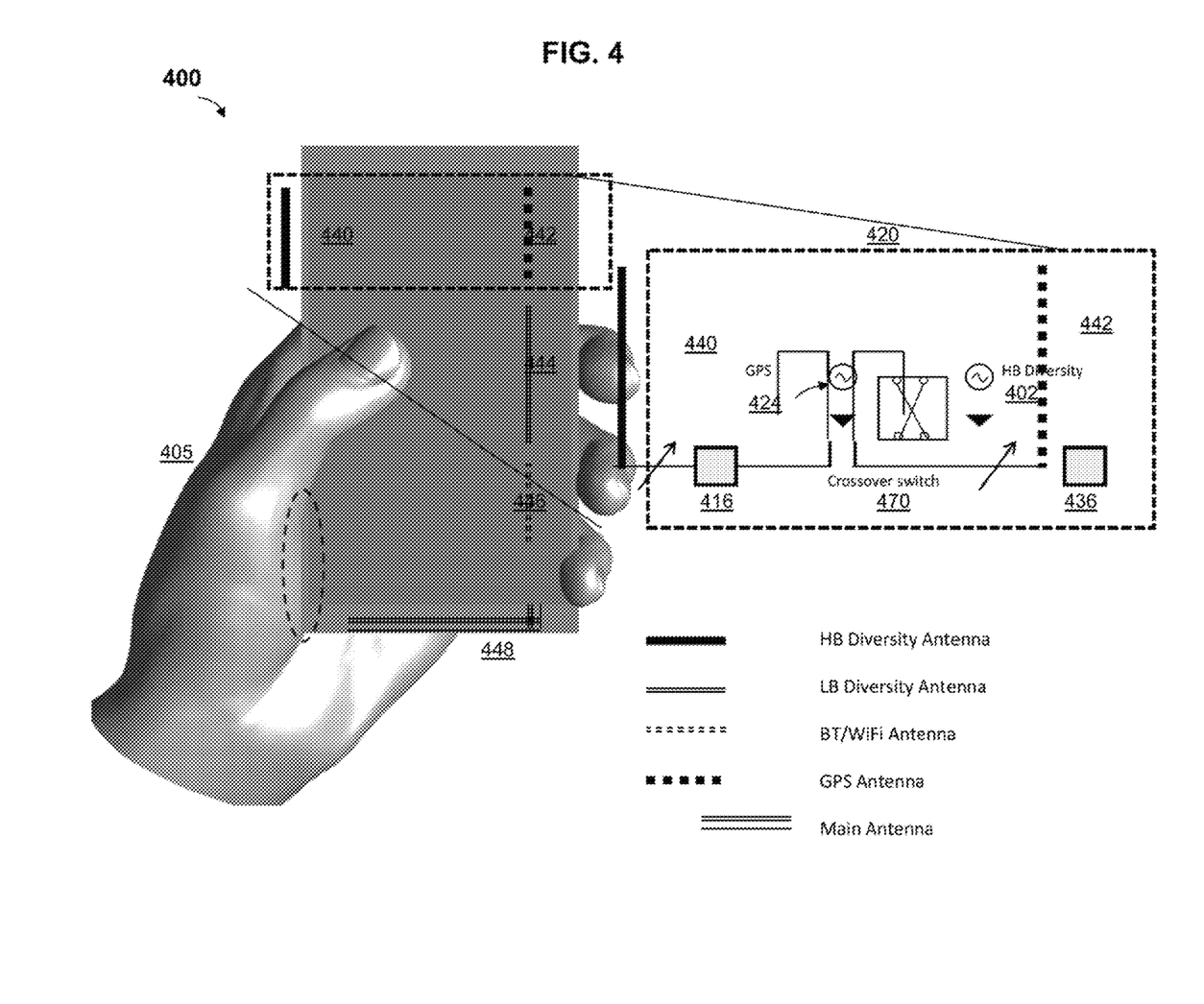
FIG. 4 is a block diagram illustrating a specific device handling and positioning arrangement in which a wireless communication device is held in a user's hand, according to one embodiment.

FIG. 4 is a block diagram illustrating a specific device handling and positioning arrangement in which a wireless communication device is held in a user's hand, according to one embodiment. Hand-device arrangement 400 illustrates a wireless communication device being held in the user's left hand. Hand-device arrangement 400 comprises left hand 405 and wireless communication device 100. Wireless communication device 100 comprises several antennas including high band (HB) tunable diversity antenna 440 and global positioning system (GPS) antenna 442. In addition, wireless communication device 100 includes low band (LB) diversity antenna 444, WiFi antenna 446 and main antenna 448. Also illustrated within hand-device arrangement 400 is antenna system 420 which includes HB tunable diversity antenna 440 and GPS antenna 442. Antenna system 420 is located within wireless communication device 100 but, for illustrative purposes, is shown external to wireless communication device 100 within an inset figure. Antenna system 420 also includes GPS receiver 424, HB diversity transceiver 402 and crossover switch 470 which is coupled to GPS receiver 424 and to HB diversity transceiver 402. As introduced in FIG. 1, antenna system 420 includes first antenna tuner 416 and second antenna tuner 436. Additionally, wireless communication device 100 includes a number of sensors 118 (FIG. 1). The sensors provide information that indicates whether wireless communication device 100 is being held by a right hand or a left hand and a location of the user's head relative to the device. For a wireless communication device having antennas located at a lower or base segment of the wireless communication device, empirical data indicates that absorption loss is higher on the palm side (compared with absorption loss on a non-palm side) while the device is being held in the right hand or left hand.

For a wireless communication device having antennas located at an upper or top segment of the wireless communication device, empirical data indicates that absorption loss is higher as a result of the head making contact with or being in close proximity of the device (compared with absorption loss resulting from a presence of the hand) while the device is being held in the "talk" position. In the talk position, the user physically interacts with the wireless communication device using head and hand. In one embodiment, antenna system controller 160 is able to identify a presence of the user's head, distinguish between a left side and a right side of the user's head, and to appropriately configure the antenna system for a specific usage state by considering whether the left side or the right side of the user's head is involved in a detected talk position. In one embodiment, antenna system controller 160 receives information about the presence of the user's head from a capacitive touch and/or proximity sensor(s). Although antenna system hardware such as antenna elements and antenna feeds are placed in fixed positions, antenna system controller 160 is able to switch transmission of a signal from a first antenna to transmission of the signal from a second antenna to support a specific configuration state. In one embodiment, while antenna system controller 160 switches signal transmission from a first antenna to signal transmission from a second antenna, antenna system controller 160 switches signal reception from the second antenna to signal reception from the first antenna.

Antenna system controller 160 configures an antenna system by using configuration parameters mapped to a corresponding reference usage state that matches a usage state that occurs within wireless communication device 100. In one embodiment, antenna system controller 160 configures an antenna system by using configuration parameters mapped to a corresponding reference usage state that is predicted by usage state statistics which capture user habits and patterns from a historical record of usage states that occur within wireless communication device 100. Referring to the particular example of FIG. 4, antenna system controller 160 receives sensor data indicating whether the user operates wireless communication device 100 using the left hand or right hand, and/or head position and is able to perform antenna system configuration and/or antenna tuning based on right or left hand use and/or head position.

Figure 5:
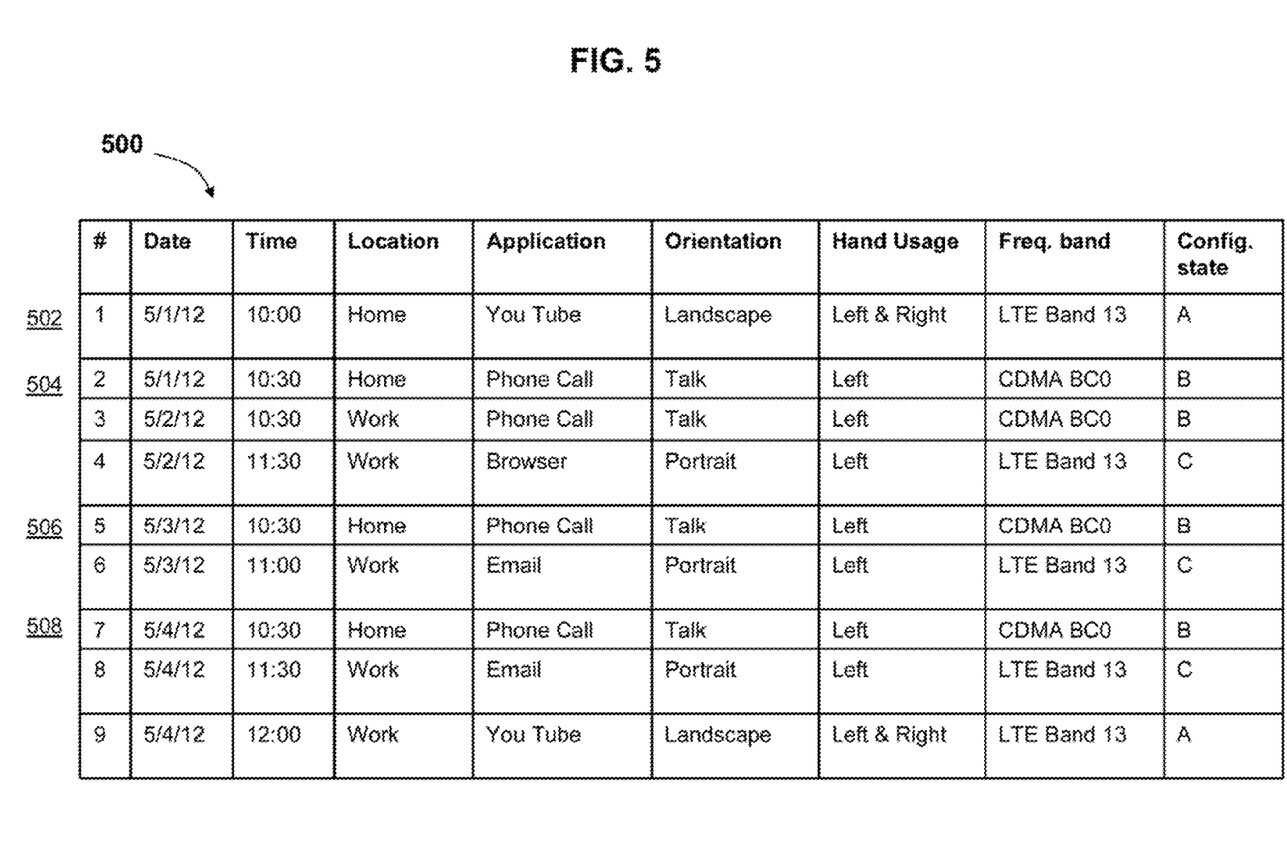
FIG. 5 is a table mapping pre-identified reference usage states to antenna system configuration states, according to one embodiment.

FIG. 5 is a table mapping pre-identified reference usage states to antenna system configuration states, according to one embodiment. In one embodiment, table 500 provides configuration states that are determined using calculations and/or empirical methods. In particular, the configuration states are values that have been demonstrated in experiments and/or simulations to provide an acceptable level of performance in enhancing communication signal quality when a user operates the wireless communication device in a specific usage state. The first four columns of table 500 provides (i) an event or usage state order number labeled with "#", (ii) a date at which the usage state occurs, (iii) a time at which the usage state occurs, and (iv) a location of wireless communication device 100 when the usage state occurs. The fifth column of table 500 identifies an active application corresponding to the specific usage state. Table 500 provides device orientation corresponding to the specific usage state in the sixth column. In one embodiment, device orientation is identified as one of "talk", "landscape" and "portrait". In the seventh column, table 500 identifies a hand usage corresponding to the usage state (i.e., use of the left hand, the right hand or both left and right hands). The table can also include other columns of data, such as a column identifying head position. In the eighth column, table 500 identifies an active operating frequency band corresponding to the specific usage state. In addition, in the ninth column, table 500 identifies configuration state data that is mapped to the specific usage state. In general, table 500 provides information to define a specific usage state within columns 3 through 8 and provides configuration data within column 9.

Referring specifically to table 500, first row 502 of table 500 describes a specific usage state identified as usage state #1. Usage state #1 occurred in wireless communication device 100 on May 1, 2012 (5/1/12) at 10:00 AM while wireless communication device 100 is being operated at the user's home. Usage state #1 includes the wireless communication device being operated to run YouTube (i.e., video streaming application). The sixth column indicates that "Landscape" is the device orientation corresponding to usage state #1. Both the left and right hands were used to hold wireless communication device 100 while in usage state #1. Long Term Evolution (LTE) Band 13 is the operating frequency band corresponding to usage state #1. Additionally, configuration state "A" is the antenna system configuration state that is mapped to usage state #1. A configuration state (e.g., configuration state "A") provides configuration parameters for at least one of: (a) antenna selection; (b) antenna tuning; and (c) transmit signal power adjustment.

Table 500 indicates that usage state #2, usage state #5 and usage state #7 which are respectively defined within row 504, row 506 and row 508 are substantially identical. Usage states #2, #5 and #7 occurs at 10:30 AM on three different days of a four day period from May 1, 2012 through May 4, 2012. Table 500 indicates that in these identical usage states, wireless communication device 100 is used to place a phone call at 10:30 AM. In addition, wireless communication device 100 is held in the left hand while the phone call is placed, and the call is routed using the code division multiple access (CDMA) BC0 band. Antenna system controller 160 uses a pre-identified number of occurrences of a usage state to confirm that a trend is established. If antenna system controller 160 establishes this particular usage state as a trend, antenna system controller 160 is able to use the established trend to predict a next occurrence of the usage state and to pre-configure the antenna for left hand use and tune the corresponding antenna system for the BC0 band if the user is in the same location at the same time (i.e., at home at 10:30 AM).

Figure 6:
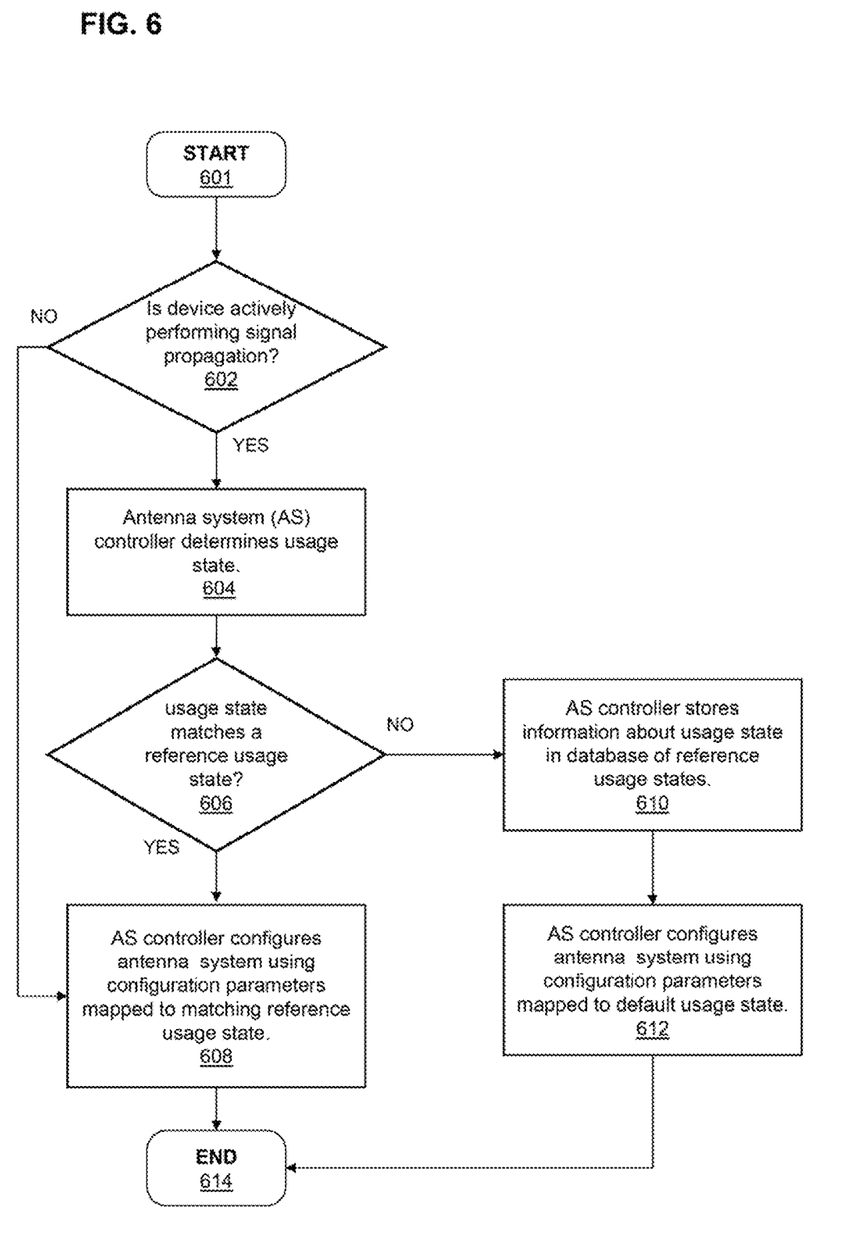
FIG. 6 is a flow chart illustrating one embodiment of a method for configuring an antenna system when a specific usage state occurs within the wireless communication device.
Figure 7:
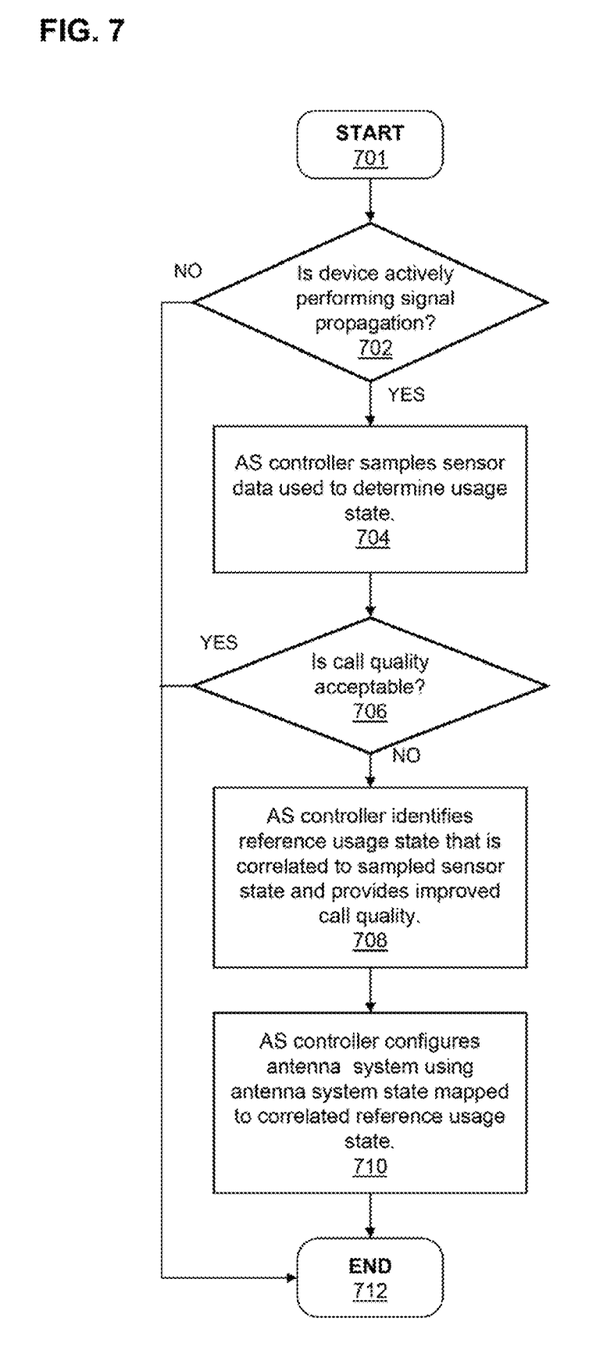
FIG. 7 is a flow chart illustrating one embodiment of a method for configuring an antenna system based on received sensor data and a detected signal quality within a wireless communication device.
Figure 8:
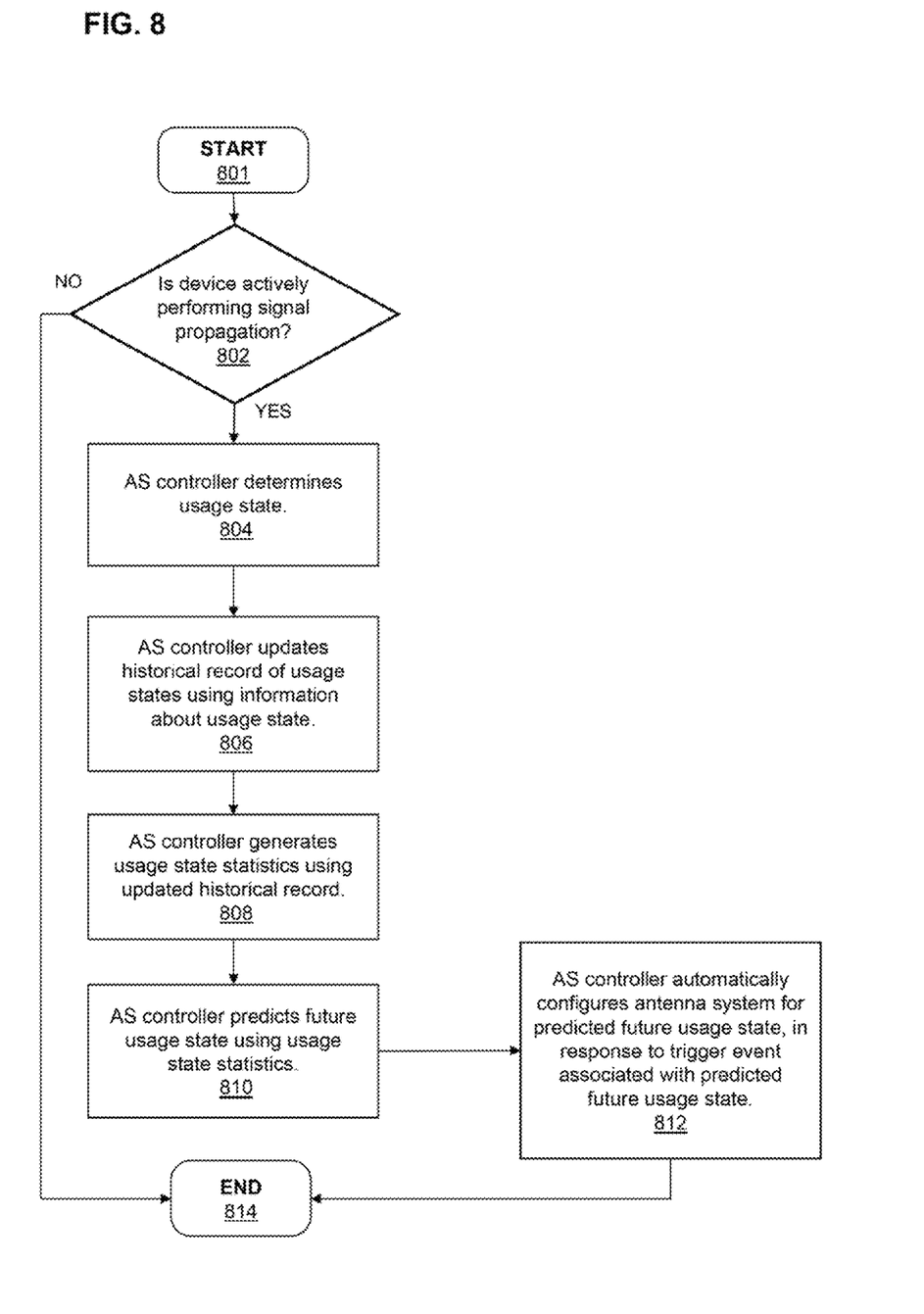
FIG. 8 is a flow chart illustrating one embodiment of a method for generating usage state statistics and using the generated usage state statistics to predict future usage states within the wireless communication device.

FIGS. 6-8 are flow charts illustrating embodiments of the method by which the above processes of the illustrative embodiments can be implemented. Specifically, FIG. 6 illustrates one embodiment of a method for configuring an antenna system when a specific usage state occurs within a wireless communication device. FIG. 7 illustrates one embodiment of a method for configuring an antenna system based on an occurrence of a specific usage state and a detected signal quality within a wireless communication device. FIG. 8 illustrates one embodiment of a method for generating usage state statistics and using the generated usage state statistics to predict future usage states within a wireless communication device. Although the method illustrated by FIGS. 6-8 may be described with reference to components and functionality illustrated by and described in reference to FIGS. 1-5, it should be understood that this is merely for convenience and alternative components and/or configurations thereof can be employed when implementing the method. Certain portions of the methods may be completed by ASC utility 167 executing on one or more processors (processor 105 or DSP 128) within wireless communication device 100 (FIG. 1) or a processing unit or antenna system controller 160 of transceiver module 130, 200 and 300 (FIG. 1-3). The executed processes then control specific operations of or on transceiver module 130. For simplicity is describing the method, all method processes are described from the perspective of transceiver module 130 and specifically antenna system controller 160.

The method of FIG. 6 begins at initiator block 601 and proceeds to decision block 602 at which antenna system controller 160 determines whether wireless communication device 100 is actively performing signal propagation. In response to determining that wireless communication device 100 is actively performing signal propagation, antenna system controller 160 identifies a current usage state (block 604). Antenna system controller 160 determines whether the identified usage state matches a reference usage state from a database of stored reference usage states (decision block 606). In response to determining that the identified usage state matches a reference usage state, antenna system controller 160 configures the antenna system using configuration parameters (i.e., from table 500) mapped to the matching reference usage state (block 608).

In response to determining that the identified usage state does not match a reference usage state, antenna system controller 160 stores information about the current usage state in a database of reference usage states (block 610). Following block 610, the process moves to block 612 at which antenna system controller 160 configures the antenna system using configuration parameters mapped to a default usage state. The process ends at block 614.

The method of FIG. 7 begins at initiator block 701 and proceeds to decision block 702 at which antenna system controller 160 determines whether wireless communication device 100 is actively performing signal propagation. In response to determining that wireless communication device 100 is actively performing signal propagation, antenna system controller 160 samples sensor data from one or more device sensors 118 (FIG. 1), to determine a current usage state (block 704). Antenna system controller 160 determines whether the signal quality associated with an initiated application is acceptable (decision block 706). In response to determining that the signal quality associated with the initiated application is acceptable, the process proceeds to end block 712. In response to determining that the signal quality associated with the initiated application is not acceptable, antenna system controller 160 identifies a reference usage state that is correlated to the sampled sensor state and is mapped to configuration parameters that provide improved signal quality (block 708). Following block 708, the process moves to block 710 at which antenna system controller 160 configures the antenna system using configuration parameters mapped to the correlated reference usage state. The process ends at block 712.

The method of FIG. 8 begins at initiator block 801 and proceeds to decision block 802 at which antenna system controller 160 determines whether wireless communication device 100 is actively performing signal propagation. In response to determining that wireless communication device 100 is actively performing signal propagation, antenna system controller 160 identifies a current usage state of the device (block 804). Antenna system controller 160 updates a historical record (e.g., table 500) of usage states using information about the current usage state (block 806). Antenna system controller 160 generates usage state statistics using the updated historical record (block 808). Antenna system controller 160 predicts a future usage state using the generated usage state statistics (block 810). In response to detection of a trigger event associated with the predicted future usage state, antenna system controller 160 automatically configures the antenna system for the predicted future usage state (block 812). The process ends at block 814.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for configuring an antenna system in a wireless communication device, the method comprising:
    identifying a usage state of the wireless communication device;
    determining whether the identified usage state matches a pre-identified reference usage state from among at least one pre-identified reference usage state of the wireless communication device;
    in response to the identified usage state matching a pre-identified reference usage state, configuring the antenna system using configuration data associated with the reference usage state to enhance an antenna performance of the wireless communication device; and
    in response to the identified usage state not matching a reference usage state: storing information about the identified usage state within a database of reference usage states; and determining configuration parameters that best configure the antenna system for supporting operations of the device while in the identified usage state.

2. The method of claim 1, further comprising:
    updating a historical record of usage states with the information about the identified usage state;
    generating usage state statistics using the updated historical record; and
    predicting a timing of an occurrence of a specific future usage state based on the usage state statistics and identifying one or more trigger events associated with the occurrence of the future usage state.

3. The method of claim 2, further comprising:
    generating, from the historical record, a probability distribution of usage states to derive the usage state statistics and identify user usage characteristics;
    developing a user profile that indicates the user usage characteristics; and
    in response to an occurrence of a trigger event associated with the future usage state, automatically configuring the antenna system to support device operation in the future usage state using configuration parameters mapped to a corresponding reference usage state within the database.

4. The method of claim 2, wherein said identifying the usage state further comprises:
    receiving sensor data from at least one sensor from among: (a) a device location sensor; (b) atmospheric pressure sensor; (c) an accelerometer; (d) a gyroscope; (e) a WiFi signal level sensor; (f) a Bluetooth signal level sensor; (g) a proximity detect sensor; and (h) a light sensor;
    determining device handling and positioning using the received sensor data; and
    determining the usage state utilizing a combination of (a) the received sensor data; (b) the device handling and positioning (c) an application type initiated by the user; and (d) an operating frequency band that is active when the usage state occurs.

5. The method of claim 4, wherein said determining device handling and positioning further comprises:
    identifying from sensor data whether the user interacts with the wireless communication device using at least one of (a) a left hand, (b) a right hand, (c) both hands, (d) neither the left hand nor the right hand, (e) a left side of a user's head and (f) a right side of the user's head.

6. The method of claim 2, further comprising:
    storing information about the identified usage state and the usage state statistics within at least one of (a) a local storage and (b) a remote storage.

7. The method of claim 1, wherein said configuring further comprises at least one of:
    selectively switching propagation of a communication signal from a first antenna configuration to a second antenna configuration;
    adjusting transmit signal power; and
    performing antenna tuning corresponding to the identified usage state.

8. The method of claim 1, further comprising:
    in response to a first usage state being associated with simultaneous propagation of both a higher priority signal and a lower priority signal, determining configuration parameters that support the higher priority signal for use when configuring the antenna system while the device is in the first usage state.

9. The method of claim 1, further comprising:
    in response to the identified usage state not matching a reference usage state, configuring the antenna system with at least one of: (a) a default antenna system configuration; and (b) an antenna system configuration based on signal quality feedback.

10. The method of claim 1, wherein said configuring further comprises:
    performing antenna system configuration to enhance antenna performance for the identified usage state using configuration parameters that are mapped to a matching reference usage state and which provide a specific signal quality performance for an initiated application.

11. A wireless communication device having a transceiver module coupled to at least one antennas and which includes:
    at least one processor;
    at least one transceiver;
    an antenna system comprising at least one antenna tuner and at least one antenna; and
    an antenna system controller that:
    identifies a usage state of the wireless communication device;
    determines whether the identified usage state matches a pre-identified reference usage state from among at least one pre-identified reference usage state of the wireless communication device;
    in response to the identified usage state matching a pre-identified reference usage state, configures the antenna system using configuration data associated with the reference usage state to enhance an antenna performance of the wireless communication device; and
    in response to the identified usage state not matching a reference usage state: stores information about the identified usage state within a database of reference usage states; and
    determines configuration parameters that best configure the antenna system for supporting operations of the device while in the identified usage state.

12. The wireless communication device of claim 11, wherein the antenna system controller:
    updates a historical record of usage states with the information about the identified usage state;

generates usage state statistics using the updated historical record; and predicts a timing of an occurrence of a specific future usage state based on the usage state statistics and identifying one or more trigger events associated with the occurrence of the future usage state.

13. The wireless communication device of claim 12, wherein the antenna system controller:

generates, from the historical record, a probability distribution of usage states to derive the usage state statistics and identify user usage characteristics;

develops a user profile that indicates the user usage characteristics; and in response to an occurrence of a trigger event associated with the future usage state, automatically configures the antenna system to support device operation in the future usage state using configuration parameters mapped to a corresponding reference usage state within the database.

14. The wireless communication device of claim 12, wherein the antenna system controller:

receives sensor data from at least one sensor from among: (a) a device location sensor; (b) atmospheric pressure sensor; (c) an accelerometer; (d) a gyroscope; (e) a WiFi signal level sensor; (f) a Bluetooth signal level sensor; (g) a proximity detect sensor; and (h) a light sensor;

determines device handling and positioning using the received sensor data; and determines the usage state utilizing a combination of (a) the received sensor data; (b) the device handling and positioning (c) an application type initiated by the user; and (d) an operating frequency band that is active when the usage state occurs.

15. The wireless communication device of claim 14, wherein the antenna system controller:

identifies from sensor data whether the user interacts with the wireless communication device using at least one of (a) a left hand, (b) a right hand, (c) both hands, (d) neither the left hand nor the right hand, (e) a left side of a user's head and (f) a right side of the user's head.

16. The wireless communication device of claim 12, wherein the antenna system controller:

stores information about the identified usage state and the usage state statistics within at least one of (a) a local storage and (b) a remote storage.

17. The wireless communication device of claim 11, wherein the antenna system controller performs at least one of:

selectively switching propagation of a communication signal from a first antenna configuration to a second antenna configuration;

adjusting transmit signal power; and performing antenna tuning corresponding to the identified usage state.

18. The wireless communication device of claim 11, wherein the antenna system controller:

in response to a first usage state being associated with simultaneous propagation of both a higher priority signal and a lower priority signal, determines configuration parameters that support the higher priority signal for use when configuring the antenna system while the device is in the first usage state.

19. The wireless communication device of claim 11, wherein the antenna system controller:

in response to the identified usage state not matching a reference usage state, configures the antenna system using at least one of: (a) a default antenna system configuration; and (b) an antenna system configuration based on signal quality feedback.

20. The wireless communication device of claim 11, wherein the antenna system controller:

performs antenna system configuration to enhance antenna performance for the identified usage state using configuration parameters that are mapped to a matching reference usage state and which provide a specific signal quality performance for an initiated application.

* * * * *